United States Patent
Liao et al.

(10) Patent No.: US 12,236,060 B2
(45) Date of Patent: Feb. 25, 2025

(54) INTERFACE DISPLAY METHOD AND APPARATUS, AND ELECTRONIC DEVICE

(71) Applicant: VIVO MOBILE COMMUNICATION CO., LTD., Guangdong (CN)

(72) Inventors: Weijian Liao, Guangdong (CN); Bowen Wu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 2 days.

(21) Appl. No.: 18/125,672

(22) Filed: Mar. 23, 2023

(65) Prior Publication Data

US 2023/0229286 A1 Jul. 20, 2023

Related U.S. Application Data

(63) Continuation of application No. PCT/CN2021/119604, filed on Sep. 22, 2021.

(30) Foreign Application Priority Data

Sep. 27, 2020 (CN) .......................... 202011030939.4

(51) Int. Cl.
  *G06F 3/048* (2013.01)
  *G06F 3/04817* (2022.01)
  *G06F 3/0484* (2022.01)

(52) U.S. Cl.
  CPC ........ *G06F 3/04817* (2013.01); *G06F 3/0484* (2013.01)

(58) Field of Classification Search
  CPC .......................... G06F 3/04817; G06F 3/0484
  See application file for complete search history.

(56) References Cited

U.S. PATENT DOCUMENTS

| | | | |
|---|---|---|---|
| 10,200,824 B2* | 2/2019 | Gross | G06F 3/04186 |
| 10,748,233 B2* | 8/2020 | Zhao | G06F 9/485 |

(Continued)

FOREIGN PATENT DOCUMENTS

| | | |
|---|---|---|
| CN | 103513978 A | 1/2014 |
| CN | 104169854 A | 11/2014 |

(Continued)

OTHER PUBLICATIONS

International Search Report and Written Opinion for Application No. PCT/CN2021/119604, dated Dec. 22, 2021, 10 Pages.

(Continued)

*Primary Examiner* — David Phantana-angkool
(74) *Attorney, Agent, or Firm* — BROOKS KUSHMAN P.C.

(57) ABSTRACT

An interface display method and apparatus, and an electronic device are provided. The method includes: receiving, in a case that a first target interface is displayed, a first input; and displaying, in response to the first input, a second target interface. The first target interface and the second target interface are one of a first interface, a second interface, and a third interface, the first target interface is different from the second target interface, at least one image is displayed on the first interface, and the image corresponds to an application program previously used. The second interface is a main screen interface, and application icons of all application programs installed by the electronic device are displayed on the third interface.

20 Claims, 5 Drawing Sheets

(56) References Cited

U.S. PATENT DOCUMENTS

| | | | |
|---|---|---|---|
| 11,693,540 B1* | 7/2023 | Zou | G06F 3/0482 |
| | | | 715/765 |
| 11,921,977 B2* | 3/2024 | Li | G06F 3/04817 |
| 2015/0143272 A1* | 5/2015 | Wu | H04M 1/72469 |
| | | | 715/765 |
| 2015/0186024 A1 | 7/2015 | Hong et al. | |
| 2017/0123607 A1* | 5/2017 | Srinivasan | G06F 3/04817 |
| 2018/0348993 A1 | 12/2018 | Bai | |
| 2019/0179500 A1* | 6/2019 | Kim | G06F 3/048 |
| 2019/0391825 A1* | 12/2019 | Jann | G06F 3/0482 |
| 2020/0241746 A1 | 7/2020 | Chen et al. | |
| 2020/0286449 A1 | 9/2020 | Yang | |
| 2020/0333944 A1 | 10/2020 | Guo | |
| 2020/0371648 A1 | 11/2020 | Huang | |
| 2021/0096728 A1 | 4/2021 | Dong et al. | |
| 2021/0286480 A1* | 9/2021 | Tyler | G06F 3/0483 |
| 2021/0286487 A1* | 9/2021 | Tyler | G06F 3/0488 |
| 2021/0286488 A1* | 9/2021 | Tyler | G06F 3/0483 |
| 2021/0286489 A1* | 9/2021 | Tyler | G06F 3/04845 |
| 2021/0286510 A1* | 9/2021 | Tyler | G06F 3/04845 |
| 2022/0197486 A1 | 6/2022 | Xiong | |
| 2022/0326816 A1* | 10/2022 | Walkin | G06F 3/0482 |
| 2022/0365641 A1 | 11/2022 | Luo | |
| 2023/0101774 A1* | 3/2023 | West | G06F 3/04842 |
| | | | 715/770 |
| 2024/0019987 A1* | 1/2024 | Han | G06F 3/0482 |
| 2024/0045564 A1* | 2/2024 | Walkin | G06F 3/04845 |

FOREIGN PATENT DOCUMENTS

| | | |
|---|---|---|
| CN | 105718148 A | 6/2016 |
| CN | 106598379 A | 4/2017 |
| CN | 107256152 A | 10/2017 |
| CN | 109471603 A | 3/2019 |
| CN | 109542282 A | 3/2019 |
| CN | 109947521 A | 6/2019 |
| CN | 109981878 A | 7/2019 |
| CN | 110088719 A | 8/2019 |
| CN | 110168483 A | 8/2019 |
| CN | 110244893 A | 9/2019 |
| CN | 110554899 A | 12/2019 |
| CN | 110832449 A | 2/2020 |
| CN | 110968228 A | 4/2020 |
| CN | 111026303 A | 4/2020 |
| CN | 111142991 A | 5/2020 |
| CN | 111638826 A | 9/2020 |
| CN | 112181567 A | 1/2021 |
| WO | 2020011076 A1 | 1/2020 |

OTHER PUBLICATIONS

Extended European search Report for Application No. 21871493.9, dated Jan. 5, 2024, 12 Pages.

First Office Action for Chinese Application No. 202011030939.4, dated Sep. 5, 2024, 9 Pages.

Second Office Action for European Application No. 21871493.9, dated Jun. 27, 2024, 8 Pages.

* cited by examiner

INTERFACE DISPLAY METHOD AND APPARATUS, AND ELECTRONIC DEVICE

CROSS-REFERENCE TO RELATED APPLICATIONS

This application is a continuation of International Application No. PCT/CN2021/119604 filed on Sep. 22, 2021, which claims priority to Chinese Patent Application No. 202011030939.4 filed on Sep. 27, 2020, which are incorporated herein by reference in their entireties.

TECHNICAL FIELD

This application belongs to the field of communication technologies, and in particular, to an interface display method and apparatus, and an electronic device.

BACKGROUND

With the development of communication technology, there are more and more kinds of functions realizable on an electronic device, so application programs with a plurality of functions are installed on the electronic device. But in an actual use process, due to numerous icons of application programs, when a user needs to open an application program, if he does not remember a name of the application program, he needs to look up the icons of the application programs one by one, which costs too much time to find the application program. It can be seen that, currently, the efficiency of finding an application program is too low.

SUMMARY

A purpose of embodiments of this application is to provide an interface display method and apparatus, and an electronic device.

To resolve the foregoing technical problems, this application is implemented as follows:

According to a first aspect, the embodiments of this application provide an interface display method. The method is applied to an electronic device and the method includes:
receiving, in a case that a first target interface is displayed, a first input; and
displaying, in response to the first input, a second target interface, where
the first target interface and the second target interface are one of a first interface, a second interface, and a third interface, the first target interface is different from the second target interface, at least one image is displayed on the first interface, and the image corresponds to an application program previously used; and the second interface is a main screen interface, and application icons of all application programs installed by the electronic device are displayed on the third interface.

According to a second aspect, the embodiments of this application provide an interface display apparatus. The interface display apparatus is applied to an electronic device, and the interface display apparatus includes:
a first receiving module, configured to receive, in a case that a first target interface is displayed, a first input; and
a first display module, configured to display, in response to the first input, a second target interface, where
the first target interface and the second target interface are one of a first interface, a second interface, and a third interface, the first target interface is different from the second target interface, at least one image is displayed on the first interface, and the image corresponds to an application program previously used; and the second interface is a main screen interface, and application icons of all application programs installed by the electronic device are displayed on the third interface.

According to a third aspect, the embodiments of this application provide an electronic device. The electronic device includes a processor, a memory, and a program or an instruction stored in the memory and executable on the processor, the program or instruction, when executed by the processor, implementing steps of the method according to the first aspect.

According to a fourth aspect, the embodiments of this application provide a readable storage medium. The readable storage medium stores a program or an instruction, the program or instruction, when executed by a processor, implementing steps of the method according to the first aspect.

According to a fifth aspect, the embodiments of this application provide a chip. The chip includes a processor and a communication interface, the communication interface being coupled to the processor, and the processor being configured to run a program or an instruction to implement the method according to the first aspect.

In the embodiments of this application, in a case that a first target interface is displayed, a first input is received; and in response to the first input, a second target interface is displayed. The first target interface and the second target interface are one of a first interface, a second interface, and a third interface, the first target interface is different from the second target interface, at least one image is displayed on the first interface, and the image corresponds to an application program previously used. The second interface is a main screen interface, and application icons of all application programs installed by the electronic device are displayed on the third interface. In this way, because categories of the first interface, the second interface, and the third interface are different, and switching between two interfaces of the first interface, the second interface, and the third interface may be performed through the first input, a switching effect for the interface is enhanced. On the one hand, all application program icons are displayed on the third interface, which is convenient for a user to complete finding of an application program on one interface. On the other hand, a used application program may be opened through the first interface. In this way, a problem that the user has difficulty finding an application program may be solved.

DETAILED DESCRIPTION

The following clearly describes the technical solutions in the embodiments of this application with reference to the accompanying drawings in the embodiments of this application. Apparently, the described embodiments are some rather than all of the embodiments of this application. All other embodiments obtained by a person of ordinary skill in the art based on the embodiments of this application without creative efforts shall fall within the protection scope of this application.

The terms such as "first" and "second" in the specification and the claims of this application are intended to distinguish between similar objects, but are not used for describing a specific sequence or a chronological order. It is to be understood that the data used in such a way is interchangeable in proper circumstances, so that the embodiments of this application can be implemented in other sequences than the sequence illustrated or described herein. In addition, objects distinguished by "first", "second", and the like are usually of one type, and a quantity of the objects is not limited. For example, a first object may be one or more than one. In addition, "and/or" in the specification and claims represents at least one of connected objects. The character "/" generally indicates an "or" relationship between the associated objects.

The following describes the interface display method and the electronic device provided in the embodiments of this application in detail through specific embodiments and application scenarios thereof with reference to the accompanying drawings.

Figure 1:
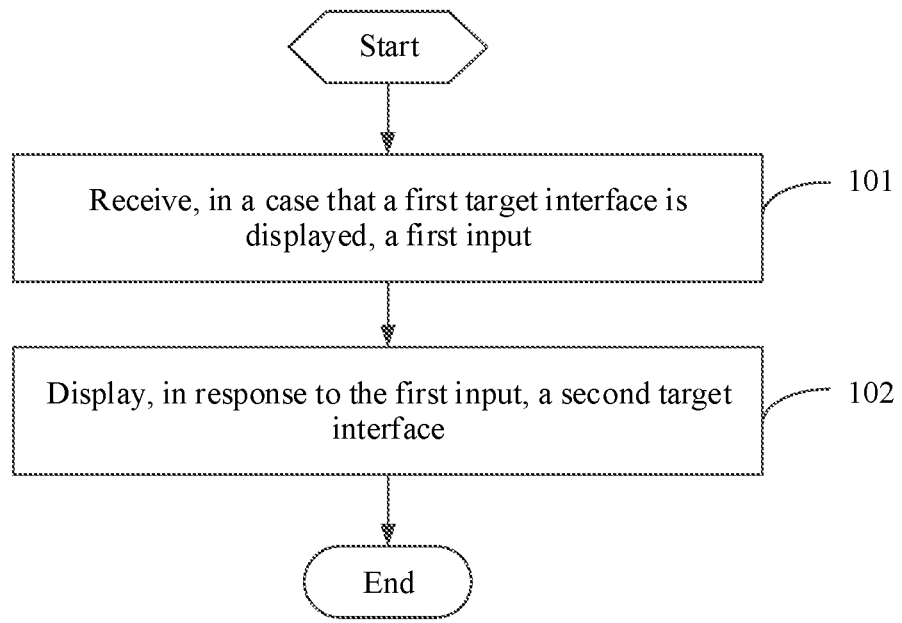
FIG. 1 is a flowchart of an interface display method according to an embodiment of this application.

FIG. 1 is a flowchart of an interface display method according to an embodiment of this application. The method is applied to an electronic device. As shown in FIG. 1, the interface display method includes the following steps:

Step 101: Receive, in a case that a first target interface is displayed, a first input.

A specific type of the first input is not limited herein. For example, the first input may be one or more of methods such as a voice input, a touch input, or a sliding input. In this way, diversity of methods of the first input is increased.

Step 102: Display, in response to the first input, a second target interface.

The first target interface and the second target interface are one of a first interface, a second interface, and a third interface, the first target interface is different from the second target interface, at least one image is displayed on the first interface, and the image corresponds to an application program previously used. The second interface is a main screen interface, and application icons of all application programs installed by the electronic device are displayed on the third interface.

It needs to be noted that, the main screen interface may refer to a display interface of the electronic device when the electronic device is powered on and unlocked after powered off, and is configured to display some information that a user focuses on, for example, time, a to-do list, and an icon corresponding to a commonly-used application program. In addition, one of the first interface and the third interface may be displayed on a leftmost home screen. That is, the main screen interface may be slid along the left to switch to display the leftmost home screen, and the main screen interface may be slid along the right to switch to display an interface that is not displayed on the leftmost home screen in the first interface and the third interface.

Display content of the first target interface is different from display content of the second target interface. That is, the first target interface and the second target interface are one of the first interface, the second interface, and the third interface, and the first target interface and the second target interface are different interfaces.

For example, when the first target interface is the first interface, the second target interface may be the second interface or the third interface; when the first target interface is the second interface, the second target interface may be the first interface or the third interface; and when the first target interface is the third interface, the second target interface may be the first interface or the second interface.

Figure 2:
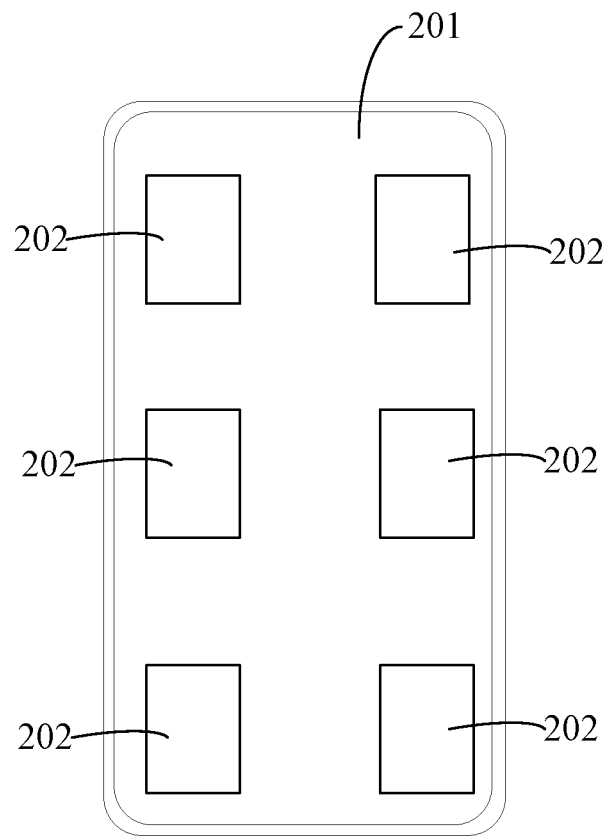
FIG. 2 is a schematic diagram of a first interface in an interface display method according to an embodiment of this application.

Referring to FIG. 2, six images 202 are displayed on a first interface 201 in FIG. 2. A display mode of the image 202 on the first interface 201 is not limited herein. For example, the image 202 may be a screenshot of an operation interface of a pre-used application program corresponding to the image 202. Certainly, the image 202 may also be an icon of the pre-used application program corresponding to the image 202, and mark information (for example, a text, a symbol, or the like) may be displayed on the icon. In addition, the image 202 may further be a screenshot of an operation interface of a pre-used application program corresponding to the image 202, and key information (for example, information such as a user image, an identification number, a bank card account, or the like) in content of the screenshot may be blurred (for example, processed through mosaic).

The pre-used application program may refer to an application program run before the first input is received, and the image 202 may be a screenshot of an operation interface acquired when the application program is run.

In an optional implementation, the second target interface is the first interface, and after the second target interface is displayed, the method further includes:

receiving a third input for a target image in the at least one image; and displaying, in response to the third input, a target operation interface corresponding to the target application program.

In this way, the third input for the target image may be received, and then the target application program is run and displayed in the target operation interface. In addition, content of the target operation interface may be the same as content of the target image. That is, a target operation interface whose display content is the same as display content of the target image may be quickly adjusted to, and a related operation may be performed on the target operation interface, so that jump of the target operation interface may be completed without memorizing an opening path of the target operation interface by a user, which improves jump efficiency and simplifies an operation of the user.

The foregoing scenario may be as follows. In a case that an electronic device displays a target operation interface of a target application program, and it is necessary to switch to an operation interface of another application program for operation, a target image of the target operation interface may be generated and stored into a first interface. In this way, after an operation on the operation interface of the another application program is completed, the electronic device may receive a third input for the target image, to jump to the target operation interface, and facilitate an operation on the target operation interface continued by a user. In the foregoing process, an operation of the user is simplified and jump efficiency is improved.

Operation information of each image may be stored in the electronic device, and the image and corresponding operation information may be packaged and stored into the electronic device. Certainly, the image and the corresponding operation information may also be respectively stored in the electronic device, and a one-to-one correspondence between the image and the corresponding operation information may be separately stored.

It needs to be noted that, specific content of the foregoing operation information is not limited herein. For example, the foregoing operation information may be information for pulling up the target operation interface of the target application program, for example, deeplink or URL of the application program.

In addition, the at least one image may be displayed in a sliding manner or deleted based on an input by the user, and the at least one image may also be called a scene page or a scene graph.

Figure 3:
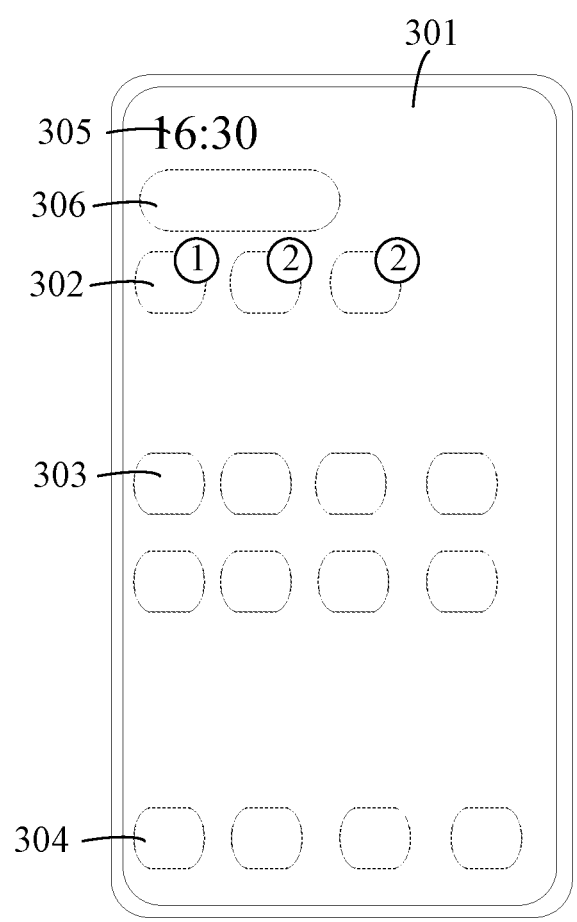
FIG. 3 is a schematic diagram of a second interface in an interface display method according to an embodiment of this application.

In an optional implementation, referring to FIG. 3, at least one of a first icon 302, a second icon 303, and a third icon 304 is displayed on a second interface 301, an application program corresponding to the first icon 302 includes an unread message, the second icon 303 is a preferentially displayed icon determined based on use information of the electronic device, and the third icon 304 is an icon corresponding to an application program running in a background. In this way, because the first icon 302, the second icon 303, and the third icon 304 are displayed on the second interface, diversity of content displayed on the second interface 301 is enhanced, and a user may complete input of different functions on the second interface 301, which facilitates an operation of the user and enhances user experience.

The first icon 302 may include a quantity of unread messages and icon content, which may be superimposed and displayed. For example, the quantity of unread messages may be displayed on the icon content as a display floating layer, or both of the quantity of unread messages and the icon content may be displayed on a same horizontal plane, that is, the quantity of unread messages and the icon content may be displayed in two different regions of the same horizontal plane.

In addition, a corresponding notification interface or message interface may be adjusted to by clicking the first icon 302. Certainly, when the first icon 302 is long pressed and dragged to an edge of the second interface 301 (for example, top of the second interface 301), the quantity of unread messages may be cleared, but a background application program corresponding to the first icon 302 and an application program corresponding to the first icon 302 are not cleared (that is, the application program is not uninstalled).

The second icon 303 may determine, based on use information of the electronic device, an icon to be preferentially displayed, and it may also be understood as follows. The second icon 303 is an icon of an application program that the user may use predicted by the electronic device based on the use information. The higher use possibility is, the higher a priority level for displaying is. The use information may include: at least one of location, time, use frequency of an application program, browsing history in a browser, search history, e-mail, short message service, schedule in a calendar, and the like.

It may be understood that the electronic device may predict the icon of the application program that the user may use based on the use information and artificial intelligence algorithm, so that a determining result of the second icon 303 can be more accurate.

Certainly, a priority level for displaying an icon corresponding to an application program can be determined based on an average value or a weighted average value of the foregoing plurality of use information of each application program. The higher the average value or the weighted average value is, the higher a level for preferentially displaying is, and the preferentially displaying includes at least one of a front display position, enlarged display, or highlighted display.

It needs to be noted that, in a case that a second icon 303 receives an input for triggering pinning of a display position, a display position of the second icon 303 remains unchanged, and a position of another second icon 303 to which an input for pinning of a display position is not triggered may be switched based on different priorities.

It needs to be noted that, a priority corresponding to each of the second icons 303 may be updated in real time, so different display positions corresponding to different second icons 303 at different moments may be different.

When there are too many third icons 304, only a first part of the third icons 304 may be displayed. When an input for a region in which the third icon 304 is located is received, a second part of the third icons 304 may be displayed, and one function button for closing background application programs corresponding to all third icons 304 may be displayed. The second part of the third icons 304 is a part of the third icons 304 hidden from the first part of the third icons 304.

In addition, the third icon 304 may be switched between an application icon and a thumbnail. For example, in a case that an input for triggering switching of a display mode of the third icon 304 is received, the third icon 304 may be controlled to switch between the application icon and the thumbnail.

In another optional implementation, at least one of first prompt information 305 and second prompt information 306 is further displayed on the second interface 301, the first prompt information 305 is used for prompting a current time, and the second prompt information 306 includes at least one of information for prompting a to-do list to a user, payment code information, and pickup code information. In this way, the user may be further prompted and diversity of content displayed by the second interface 301 may be further enhanced.

Content of the first prompt information 305 may be time, and certainly, a display mode thereof may be in a form of a clock or a digital mode. The information for prompting the to-do list to the user includes information such as a movie watching reminder, a meeting reminder, a ride reminder, and logistics process information. The payment code information may include ride code information, payment code information, or the like. The pickup code information may include pickup verification code information of express delivery, or the like.

It needs to be noted that, a manner in which icons of all application programs installed on the electronic device are displayed on the third interface is not limited herein. In an optional implementation, icons of some application programs (which are used more frequently) may be enlarged, and icons of the other application programs (which are used less frequently) may be reduced. Certainly, icons of the foregoing two parts of application program icons may be updated in real time based on a result of use frequency.

In an optional implementation, the third interface includes a first display region and a second display region, an application program icon of a first category is displayed in the first display region, and an application program icon of a second category is displayed in the second display region. In this way, the application program icon may be categorized and displayed to be better managed, and efficiency of searching for the application program icon is also improved.

In addition, in an optional implementation, an application program icon of another category may be displayed in another region, and this is not specifically limited herein. For example, an application program icon of a third category may further be displayed in a third display region.

For example, a third interface 401 may also include another display region. For example, referring to FIG. 4B, the third interface 401 may further include a fourth display region 405, and the application program icon of the third category is displayed in a second display region 404. In this way, the application program icon of the first category, the application program icon of the second category, and the application program icon of the third category may constitute all application programs installed on the electronic device.

Figure 4A:
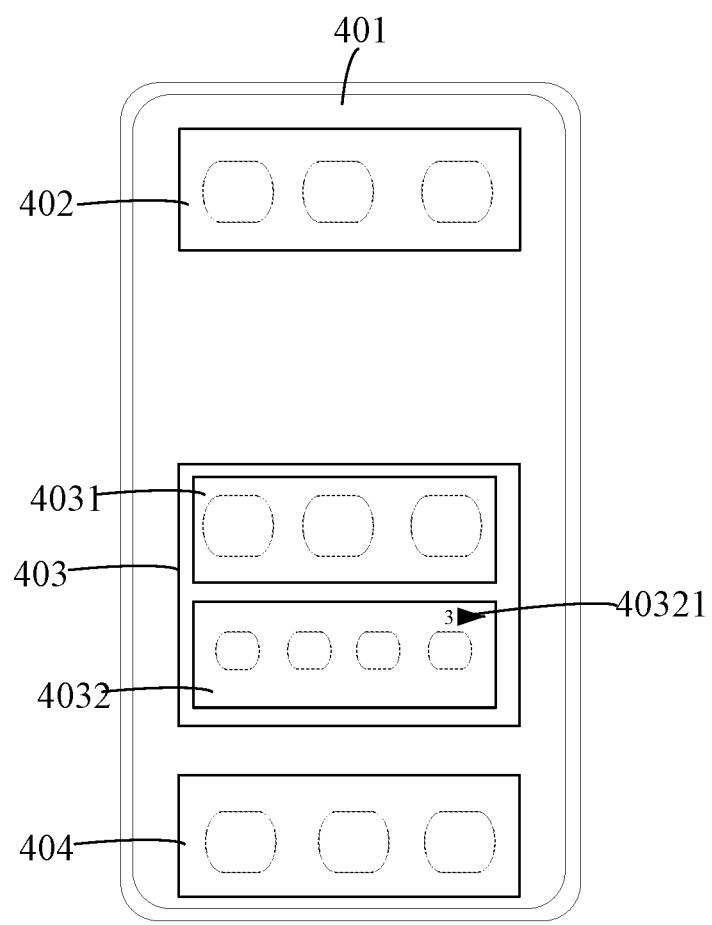
FIG. 4A is a first schematic diagram of a third interface in an interface display method according to an embodiment of this application.
Figure 4B:
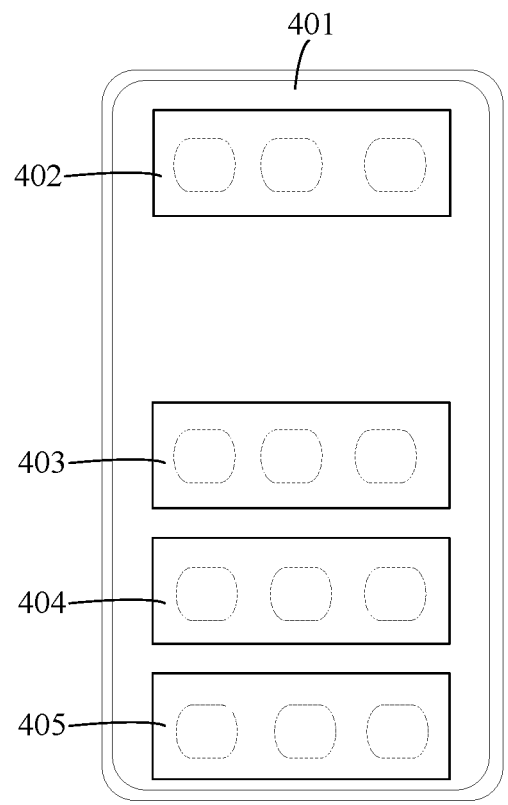
FIG. 4B is a second schematic diagram of a third interface in an interface display method according to an embodiment of this application.

For example, referring to FIG. 4B, the third interface 401 may include a first display region 403, a second display region 404, and a third display region 402. It needs to be noted that, the third display region 402 is optional, and this implementation is merely illustrative and does not specifically limit a quantity of display regions included in the third interface 401.

Categories of an application program of a first category and an application program of a second category are different. For example, the application program of the first category may be a social application program, the application program of the second category may be a video application program, and an application program of a third category may be a news reading application program.

In addition, the application program may be categorized based on a label. For example, after downloading a target application program, the electronic device may detect a label of the application program. When the label matches a label of an application program of a certain category, an icon of the application program may be moved to a position at which the application program of the category is located for displaying. When there is no label of an application program matching an application program of a certain category, an icon of the application program may be separately displayed in a target region. The label may be allocated to the application program by a server or a user.

Certainly, application programs of different categories may further be categorized based on other information. For example, the other information mentioned above may be a category of the application program or mark information of the application program.

In an optional implementation, the first display region includes a first sub-region and a second sub-region, a first preset quantity of application program icons of the first category are displayed at a first size in the first sub-region, and a second preset quantity of application program icons of the first category are displayed at a second size in the second sub-region.

The first size is greater than the second size, and the first preset quantity is less than the second preset quantity.

Referring to FIG. 4A, the first display region 403 includes a first sub-region 4031 and a second sub-region 4032, a size of an application program icon displayed in the first sub-region 4031 is larger than a size of an application program icon displayed in the second sub-region 4032, and a quantity of the application program icons displayed in the first sub-region 4031 is smaller than a quantity of the application program icons displayed in the second sub-region 4032. In addition, referring to FIG. 4A, the third interface 401 may further include the second display region 404 and the third display region 402.

In this way, flexibility and diversity of a display mode of the application program icon of the first category may be enhanced, and the application program icon of the first category may be displayed differently.

In addition, the first size and the second size may refer to display areas.

Application program icons displayed in the first sub-region and the second sub-region may be the application program icons of the first category. A use frequency of an application program corresponding to the application program icon displayed in the first sub-region may be higher than a use frequency of an application program corresponding to the application program icon displayed in the second sub-region. That is, at least one of a display order, a display position, and a display size of the application program icon of the first category may also be determined based on use information of the electronic device. A way to determine the display order of the application program icon based on the use information of the electronic device may be referred to corresponding descriptions in the following embodiments.

In addition, the application program icon of the first category and the application program icon of the second category may be divided based on a function of a corresponding application program. For example, an application program corresponding to the application program icon of the first category may be an application program including all social functions, and an application program corresponding to the application program icon of the second category may be an application program including all news reading functions. The above is merely illustrative and does not specifically limit the application program icon of the first category and the application program icon of the second category.

In an optional implementation, the method further includes:
  receiving a second input by a user to a target control in the second sub-region; and
  displaying, in response to the second input, all application program icons of the first category.

A specific type of the target control is not limited herein. For example, the target control may be an arrow symbol, an ellipsis symbol, or the like. In addition, the target control may further include a quantity of hidden application program icons of the first category. For example, referring to FIG. 4A, a target control 40321 may also be displayed in the second sub-region 4032 and a quantity of hidden application program icons of the first category may be displayed on the target control 40321.

In addition, when the first target interface is the third interface, the second input may precede the first input. When the second target interface is the third interface, the second input may follow the first input. Certainly, a specific type of the second input is not limited herein. For example, the second input may be a voice input, a touch input, a sliding input, or the like. Descriptions of the second input may be referred to corresponding descriptions of the first input above, and are not specifically described herein again.

In this implementation, all application program icons of the first category may be displayed through the target control, which is convenient for a user to view all application program icons of the first category, thereby enhancing user experience. In addition, before the second input is received, a part of the application program icons of the first category may be hidden, to save display resources.

In an optional implementation, referring to FIG. 4A and FIG. 4B, the third interface further includes a third display region 402, and a preferentially displayed application program icon determined based on use information of the electronic device is displayed in the third display region 402.

An application program icon displayed in the third display region 402 may refer to corresponding descriptions of the second icon 303 in the second interface 301 described above. This is not specifically described herein again.

In this way, an application program icon predicted to be used by a user may be displayed in the third display region 402, thereby further enhancing an intelligence degree of the electronic device, facilitating use of the user, and enhancing user experience.

For example, referring to FIG. 4B, the third interface 401 includes a first display region 403, a second display region 404, and a third display region 402. A preferentially displayed fourth icon determined based on use information of the electronic device is displayed in the third display region 402, an application program icon of a first category is displayed in the first display region 403, and an application program icon of a second category is displayed in the second display region 404.

It needs to be noted that, in an optional implementation, the application program icon of the first category and the application program icon of the second category may constitute all application programs installed on the electronic device.

In this way, because icons of all application programs may be displayed on one interface, that is, the third interface 401, the icons of all application programs may be displayed centrally, and frequent switching of an interface on which an icon of an application program is located is avoided. In addition, the icons of all application programs described above may be categorized and displayed on the third interface 401, so that the user can find the icons of the application programs more conveniently. In addition, an icon of an application program that the user may need to use may further be displayed in the third display region 402, thereby further enhancing the intelligence degree of the electronic device.

It needs to be noted that, when the foregoing icons of all application programs are categorized, the foregoing icons of all application programs may be categorized based on a label of each application program, and the label may be assigned by a server to each application program. Certainly, the label may also be customized for each application program by a user when the user downloads the each application program.

For example, the label of an application may be categorized into at least one of the following categories: category A, social, interest; category B, video, music, live; category C, news, reading; category D, tool, system; category E, shopping, take-out, service; and category F, game.

In an optional implementation, when the first target interface is the second interface and the first input is an input along a first direction, the second target interface is one of the first interface and the third interface. When the first target interface is the second interface and the first input is an input along a second direction, the second target interface is the other of the first interface and the third interface, and the first direction and the second direction are two opposite directions. In this way, the second interface may be used as a reference interface (that is, a main screen interface), and different interfaces may be switched and displayed based on different input directions, so that the intelligence degree is higher.

In another optional implementation, when the first target interface is the first interface and the first input is an input along a first direction, the second target interface may be maintained as the first interface. When the first input is an input along a second direction, the second target interface may be the second interface. Then, in a case that an input to the second interface along the second direction is received, a third target interface may be displayed, and the third target interface may be the third interface. Then, in a case that an input to the third target interface along the second direction is received, the third target interface is maintained to be displayed.

In another optional implementation, different from the foregoing embodiment, in this implementation, the first target interface is the third interface, the third target interface is the first interface, an input direction is the first direction, and the first direction is opposite to the second direction. In this way, cyclical switching among the first interface, the second interface, and the third interface may be avoided in the foregoing two implementations, that is, the first interface, the second interface, and the third interface may be controlled to switch along a fixed direction.

In the embodiments of this application, the electronic device may be a mobile phone, a tablet personal computer, a laptop computer, a personal digital assistant (PDA), a mobile Internet device (MID), a wearable device, or the like.

In the embodiments of this application, switching between two interfaces of the first interface, the second interface, and the third interface may be performed through steps 101 and 102, a switching effect for the interface is enhanced. In addition, on the one hand, all application program icons are displayed on the third interface. On the other hand, a used application program may be opened through the first interface. In this way, a problem that the user has difficulty finding an application program may be solved.

It needs to be noted that, the interface display method provided in the embodiments of this application may be performed by an interface display apparatus or a control module included in the interface display apparatus and configured to perform the interface display method. In the embodiments of this application, the interface display apparatus provided in the embodiments of this application is described by using an example in which the interface display method is performed by the interface display apparatus.

Figure 5:
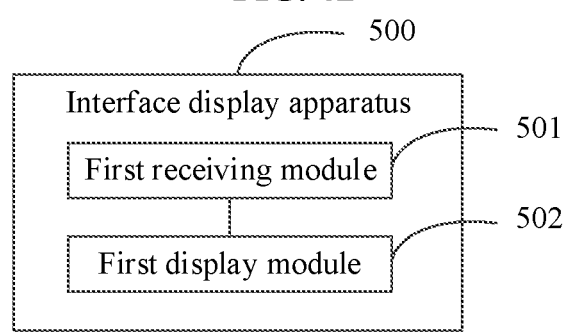
FIG. 5 is a schematic structural diagram of an interface display apparatus according to an embodiment of this application.

Referring to FIG. 5, the embodiments of this application further provide an interface display apparatus. As shown in FIG. 5, an interface display apparatus 500 includes:

a first receiving module 501, configured to receive, in a case that a first target interface is displayed, a first input; and a first display module 502, configured to display, in response to the first input, a second target interface.

The first target interface and the second target interface are one of a first interface, a second interface, and a third interface, the first target interface is different from the second target interface, at least one image is displayed on the first interface, and the image corresponds to an application program previously used. The second interface is a main screen interface, and application icons of all application programs installed by the electronic device are displayed on the third interface.

Optionally, the third interface includes a first display region and a second display region, an application program icon of a first category is displayed in the first display region, and an application program icon of a second category is displayed in the second display region.

Optionally, the first display region includes a first sub-region and a second sub-region, a first preset quantity of application program icons of the first category are displayed at a first size in the first sub-region, and a second preset quantity of application program icons of the first category are displayed at a second size in the second sub-region, where the first size is greater than the second size, and the first preset quantity is less than the second preset quantity.

Optionally, the interface display apparatus 500 further includes:

a second receiving module, configured to receive a second input by a user to a target control in the second sub-region; and a second display module, configured to display, in response to the second input, all application program icons of the first category.

Optionally, the third interface further includes a third display region, and a preferentially displayed application program icon determined based on use information of the electronic device is displayed in the third display region.

Optionally, at least one of a first icon, a second icon, and a third icon is displayed on the second interface, an application program corresponding to the first icon includes an unread message, the second icon is a preferentially displayed icon determined based on use information of the electronic device, and the third icon is an icon corresponding to an application program running in a background.

Optionally, the second target interface is the first interface, and the interface display apparatus 500 further includes:

a third receiving module, configured to receive a second input for a target image in the at least one image; and a third display module, configured to display, in response to the second input, a target operation interface of a target application program corresponding to the target image.

In this way, because categories of the first interface, the second interface, and the third interface are different, and switching between two interfaces of the first interface, the second interface, and the third interface may be performed through the first input, a switching effect for the interface is enhanced.

The interface display apparatus in the embodiments of this application may be an apparatus, or a component, an integrated circuit, or a chip in a terminal. The apparatus may be a mobile electronic device or a non-mobile electronic device. For example, the mobile electronic device may be a mobile phone, a tablet computer, a laptop computer, a palmtop computer, an in-vehicle electronic device, a wearable device, an ultra-mobile personal computer (UMPC), a netbook, or a personal digital assistant (PDA). The non-mobile electronic device may be a server, a network attached storage (NAS), a personal computer (PC), a television (TV), an automated teller machine, or a self-service machine. This is not specifically limited in the embodiments of this application.

The interface display apparatus in the embodiments of this application may be an apparatus with an operating system. The operating system may be an Android operating system, or may be an ios operating system or other possible operating systems, which is not specifically limited in the embodiments of this application.

The interface display apparatus provided in the embodiments of this application may implement the processes implemented in the method embodiments of FIG. 1 to FIG. 4B. To avoid repetition, details are not described herein again. Because categories of the first interface, the second interface, and the third interface are different, and switching between two interfaces of the first interface, the second interface, and the third interface may be performed through the first input, a switching effect for the interface is enhanced. On the one hand, all application program icons are displayed on the third interface, which is convenient for a user to complete finding of an application program on one interface. On the other hand, a used application program may be opened through the first interface. In this way, a problem that the user has difficulty finding an application program may be solved.

Figure 6:
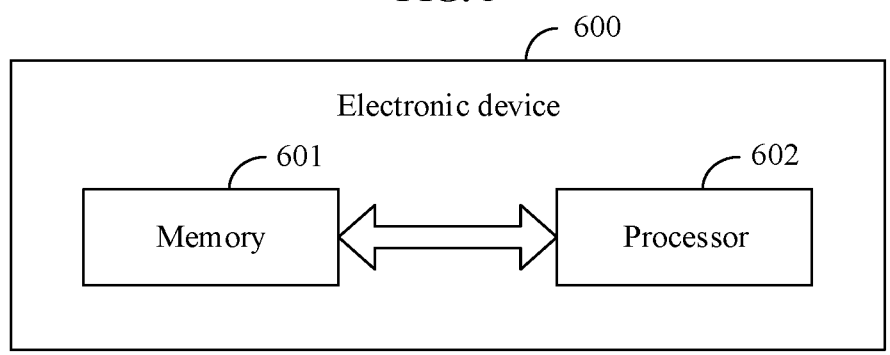
FIG. 6 is a first schematic structural diagram of an electronic device according to an embodiment of this application.

Optionally, as shown in FIG. 6, the embodiments of this application further provide an electronic device 600. The electronic device 600 includes a processor 601, a memory 602, and a program or an instruction stored in the memory 602 and executable on the processor 601. When the program or instruction is executed by the processor 601, processes of the foregoing embodiments of the interface display method are implemented, and the same technical effect can be achieved. To avoid repetition, details are not described herein again.

It needs to be noted that, the electronic device in the embodiments of this application includes the foregoing mobile electronic device and non-mobile electronic device.

Figure 7:
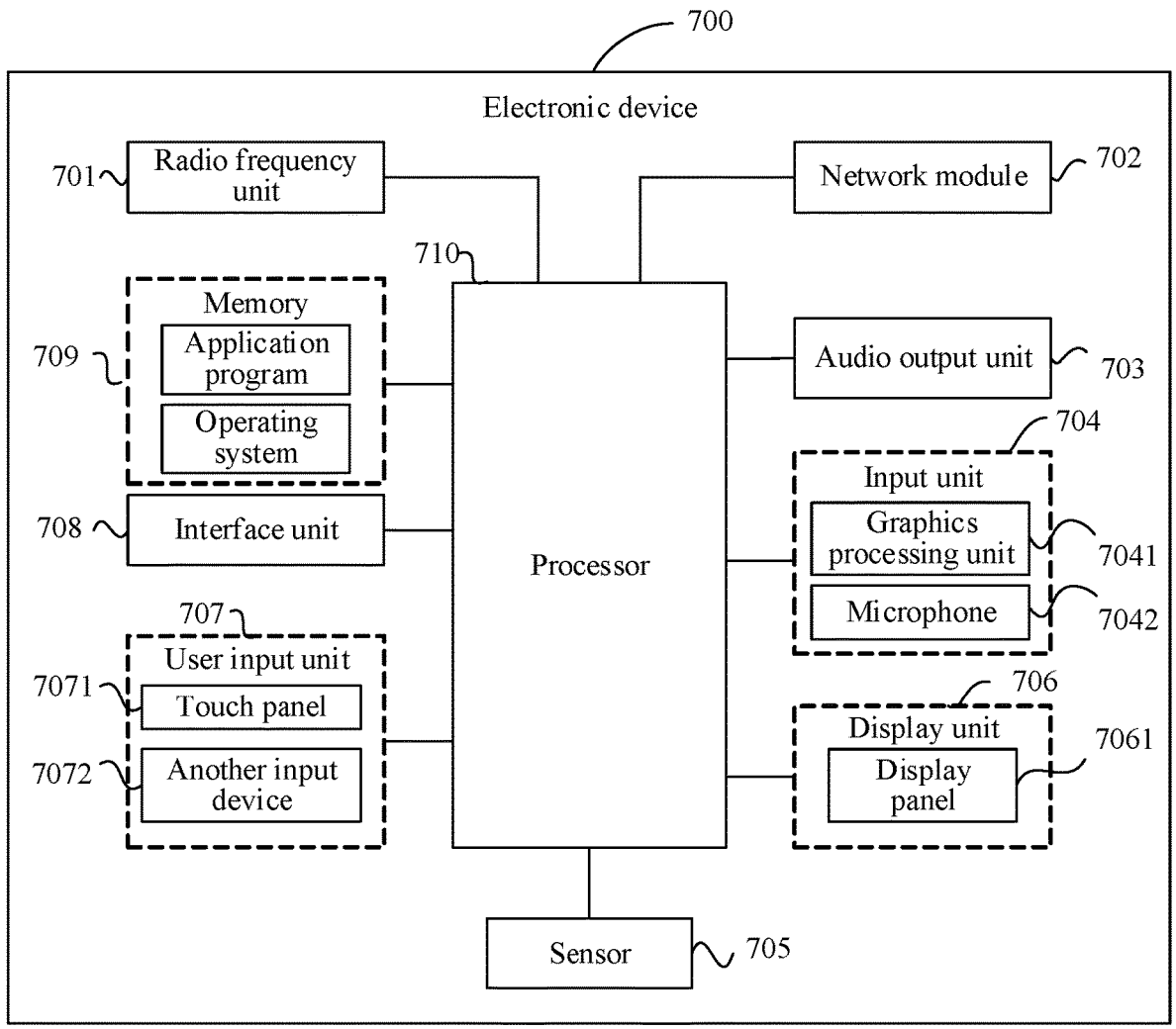
FIG. 7 is a second schematic structural diagram of an electronic device according to an embodiment of this application.

FIG. 7 is a schematic diagram of a hardware structure of an electronic device according to an embodiment of this application.

The electronic device 700 includes, but is not limited to: components such as a radio frequency unit 701, a network module 702, an audio output unit 703, an input unit 704, a sensor 705, a display unit 706, a user input unit 707, an interface unit 708, a memory 709, and a processor 710.

Those skilled in the art may understand that the electronic device 700 may further include a power supply (such as a battery) for supplying power to the components. The power supply may be logically connected to the processor 710 by using a power supply management system, thereby implementing functions such as charging, discharging, and power consumption management, by using the power supply management system. The structure of the electronic device shown in FIG. 7 constitutes no limitation on the electronic device, and the electronic device may include more or fewer components than those shown in the figure, or some components may be combined, or a different component deployment may be used. Details are not repeated herein again.

The user input unit 707 is configured to receive, in a case that a first target interface is displayed, a first input; and the display unit 706 is configured to display, in response to the first input, a second target interface. The first target interface and the second target interface are one of a first interface, a second interface, and a third interface, the first target interface is different from the second target interface, at least one image is displayed on the first interface, and the image corresponds to an application program previously used. The second interface is a main screen interface, and application icons of all application programs installed by the electronic device are displayed on the third interface.

Optionally, the third interface includes a first display region and a second display region, an application program icon of a first category is displayed in the first display region, and an application program icon of a second category is displayed in the second display region.

Optionally, the first display region includes a first sub-region and a second sub-region, a first preset quantity of application program icons of the first category are displayed at a first size in the first sub-region, and a second preset quantity of application program icons of the first category are displayed at a second size in the second sub-region, where the first size is greater than the second size, and the first preset quantity is less than the second preset quantity.

Optionally, the user input unit 707 is further configured to receive a second input by a user to a target control in the second sub-region; and the display unit 706 is further configured to display, in response to the second input, all application program icons of the first category.

Optionally, the third interface further includes a third display region, and a preferentially displayed application program icon determined based on use information of the electronic device is displayed in the third display region.

Optionally, at least one of a first icon, a second icon, and a third icon is displayed on the second interface, an application program corresponding to the first icon includes an unread message, the second icon is a preferentially displayed icon determined based on use information of the electronic device, and the third icon is an icon corresponding to an application program running in a background.

Optionally, the user input unit 707 is further configured to receive a third input for a target image in the at least one image; and the display unit 706 is further configured to display, in response to the third input, a target operation interface of a target application program corresponding to the target image.

In this way, because categories of the first interface, the second interface, and the third interface are different, and switching between two interfaces of the first interface, the second interface, and the third interface may be performed through the first input, a switching effect for the interface is enhanced. On the one hand, all application program icons are displayed on the third interface, which is convenient for a user to complete finding of an application program on one interface. On the other hand, a used application program may be opened through the first interface. In this way, a problem that the user has difficulty finding an application program may be solved.

It should be understood that in the embodiments of this application, the input unit 704 may include a graphics processing unit (GPU) 7041 and a microphone 7042, and the graphics processing unit 7041 processes image data of a still picture or a video obtained by an image capture apparatus (such as a camera) in a video capture mode or an image capture mode. The display unit 706 may include a display panel 7061. The display panel 7061 may be configured by using a liquid crystal display, an organic light-emitting diode, or the like. The user input unit 707 includes a touch panel 7071 and another input device 7072. The touch panel 7071 is also referred to as a touch screen. The touch panel 7071 may include two parts: a touch detection apparatus and a touch controller. The another input device 7072 may include, but is not limited to, a physical keyboard, a functional key (for example, a volume control key or a switch key), a track ball, a mouse, and a joystick, and the details will not be described herein again. The memory 709 may be configured to store a software program and various data which include, but are not limited to, an application program and an operating system. The processor 710 may integrate an application processor and a modem processor. The application processor mainly processes an operating system, a user interface, an application program, and the like. The modem processor mainly processes wireless communication. It may be understood that the modem processor may alternatively not be integrated into the processor 710.

The embodiments of this application further provide a readable storage medium, and the readable storage medium stores a program or an instruction. The program or instruction is executed by a processor to implement the processes of the embodiments of the interface display method, and the same technical effects can be achieved. To avoid repetition, details are not described herein again.

The processor is a processor in the electronic device in the foregoing embodiments. The readable storage medium includes a computer-readable storage medium, for example, a computer read-only memory (ROM), a random access memory (RAM), a magnetic disk, or an optical disc.

The embodiments of this application further provide a chip, including a processor and a communication interface. The communication interface is coupled to the processor, and the processor is configured to run a program or an instruction to implement processes of the embodiments of the interface display method, and the same technical effect can be achieved. To avoid repetition, details are not described herein again.

It should be noted that, the chip mentioned in the embodiments of this application may also be referred to as a system-level chip, a system chip, a chip system, a system on chip, or the like.

It needs to be noted that, terms "include", "comprise", and any variants thereof are intended to cover a non-exclusive inclusion. Therefore, in the context of a process, method, object, or apparatus that includes a series of elements, the process, method, object, or apparatus not only includes such elements, but also includes other elements not specified expressly, or may include inherent elements of the process, method, object, or apparatus. Without more limitations, elements defined by a sentence "including one" does not exclude that there are still other same elements in the process, method, object, or apparatus. Furthermore, it should be noted that a scope of the methods and apparatus in the implementations of this application is not limited to performing the functions in the order shown or discussed, but may also include performing the functions in a substantially simultaneous manner or in the reverse order depending on the functions involved. For example, the methods described may be performed in an order different from that described, and various steps may also be added, omitted, or combined. In addition, features described with reference to some examples may be combined in other examples.

Through the descriptions of the foregoing implementations, a person skilled in the art may clearly understand that the method according to the foregoing embodiments may be implemented through software and a necessary general hardware platform, and certainly, may also be implemented by hardware, but in many cases, the former manner is a better implementation. Based on such an understanding, the technical solutions of this application essentially, or the part contributing to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the methods according to the embodiments of this application.

Although the embodiments of this application have been described above with reference to the accompanying drawings, this application is not limited to the specific implementations described above, and the specific implementations described above are merely exemplary and not limitative. A person of ordinary skill in the art may make various variations under the teaching of this application without departing from the spirit of this application and the protection scope of the claims, and such variations shall all fall within the protection scope of this application.

What is claimed is:

1. An interface display method, applied to an electronic device, the method comprising:
   receiving, in a case that a first target interface is displayed, a first input; and
   displaying, in response to the first input, a second target interface, wherein
   a first one of the first target interface or the second target interface is a third interface, and a second one of the first target interface or the second target interface is a first interface or a second interface, the first target interface is different from the second target interface, at least one image is displayed on the first interface, and the image corresponds to an application program previously used; and the second interface is a main screen interface, and application icons of all application programs installed by the electronic device are displayed on the third interface,
   wherein the third interface comprises a first display region, the first display region comprises a second sub-region, a target control is displayed in the second sub-region, and a quantity of hidden application program icons of a first category is displayed on the target control.

2. The method according to claim 1, wherein the third interface further comprises a second display region, an application program icon of the first category is displayed in the first display region, and an application program icon of a second category is displayed in the second display region.

3. The method according to claim 2, wherein the first display region further comprises a first sub-region, a first preset quantity of application program icons of the first category are displayed at a first size in the first sub-region, and a second preset quantity of application program icons of the first category are displayed at a second size in the second sub-region, wherein
   the first size is greater than the second size, and the first preset quantity is less than the second preset quantity.

4. The method according to claim 3, further comprising:
   receiving a second input by a user to the target control in the second sub-region; and
   displaying, in response to the second input, all application program icons of the first category.

5. The method according to claim 2, wherein the third interface further comprises a third display region, and a preferentially displayed application program icon determined based on use information of the electronic device is displayed in the third display region.

6. The method according to claim 1, wherein at least one of a first icon, a second icon, or a third icon is displayed on the second interface, an application program corresponding to the first icon comprises an unread message, the second icon is a preferentially displayed icon determined based on use information of the electronic device, and the third icon is an icon corresponding to an application program running in a background.

7. The method according to claim 1, wherein the second target interface is the first interface, and after the displaying a second target interface, the method further comprises:
   receiving a third input for a target image in the at least one image; and
   displaying, in response to the third input, a target operation interface of a target application program corresponding to the target image.

8. An interface display apparatus, applied to an electronic device, the interface display apparatus comprising: a memory, a processor and a computer program stored in the memory and executable by the processor, wherein the processor executes the computer program to:
   receive, in a case that a first target interface is displayed, a first input; and
   display, in response to the first input, a second target interface, wherein
   a first one of the first target interface or the second target interface is a third interface, and a second one of the first target interface or the second target interface is one of a first interface or a second interface, the first target interface is different from the second target interface, at least one image is displayed on the first interface, and the image corresponds to an application program previously used; and the second interface is a main screen interface, and application icons of all application programs installed by the electronic device are displayed on the third interface,
   wherein the third interface comprises a first display region, the first display region comprises a second sub-region, a target control is displayed in the second sub-region, and a quantity of hidden application program icons of a first category is displayed on the target control.

9. The interface display apparatus according to claim 8, wherein the third interface further comprises a second display region, an application program icon of the first category is displayed in the first display region, and an application program icon of a second category is displayed in the second display region.

10. The interface display apparatus according to claim 9, wherein the first display region further comprises a first sub-region, a first preset quantity of application program icons of the first category are displayed at a first size in the first sub-region, and a second preset quantity of application program icons of the first category are displayed at a second size in the second sub-region, wherein
    the first size is greater than the second size, and the first preset quantity is less than the second preset quantity.

11. The interface display apparatus according to claim 9, wherein the third interface further comprises a third display region, and a preferentially displayed application program icon determined based on use information of the electronic device is displayed in the third display region.

12. The interface display apparatus according to claim 8, wherein at least one of a first icon, a second icon, or a third icon is displayed on the second interface, an application program corresponding to the first icon comprises an unread message, the second icon is a preferentially displayed icon determined based on use information of the electronic device, and the third icon is an icon corresponding to an application program running in a background.

13. The interface display apparatus according to claim 8, wherein the second target interface is the first interface, and after the displaying a second target interface, the processor executes the computer program to:
receive a third input for a target image in the at least one image; and
display, in response to the third input, a target operation interface of a target application program corresponding to the target image.

14. An electronic device, comprising a processor, a memory, and a program or an instruction stored on the memory and executable on the processor, wherein the processor executes the program or the instruction to:
receive, in a case that a first target interface is displayed, a first input; and
display, in response to the first input, a second target interface, wherein
a first one of the first target interface or the second target interface is a third interface, and a second one of the first target interface or the second target interface is one of a first interface or a second interface, the first target interface is different from the second target interface, at least one image is displayed on the first interface, and the image corresponds to an application program previously used; and the second interface is a main screen interface, and application icons of all application programs installed by the electronic device are displayed on the third interface,
wherein the third interface comprises a first display region, the first display region comprises a second sub-region, a target control is displayed in the second sub-region, and a quantity of hidden application program icons of a first category is displayed on the target control.

15. The electronic device according to claim 14, wherein the third interface further comprises a second display region, an application program icon of the first category is displayed in the first display region, and an application program icon of a second category is displayed in the second display region.

16. The electronic device according to claim 15, wherein the first display region further comprises a first sub-region, a first preset quantity of application program icons of the first category are displayed at a first size in the first sub-region, and a second preset quantity of application program icons of the first category are displayed at a second size in the second sub-region, wherein
the first size is greater than the second size, and the first preset quantity is less than the second preset quantity.

17. The electronic device according to claim 16, wherein the processor executes the program or the instruction to:
receive a second input by a user to the target control in the second sub-region; and
display, in response to the second input, all application program icons of the first category.

18. The electronic device according to claim 15, wherein the third interface further comprises a third display region, and a preferentially displayed application program icon determined based on use information of the electronic device is displayed in the third display region.

19. The electronic device according to claim 14, wherein at least one of a first icon, a second icon, or a third icon is displayed on the second interface, an application program corresponding to the first icon comprises an unread message, the second icon is a preferentially displayed icon determined based on use information of the electronic device, and the third icon is an icon corresponding to an application program running in a background.

20. The electronic device according to claim 14, wherein the second target interface is the first interface, and after the displaying a second target interface, the processor executes the program or the instruction to:
receive a third input for a target image in the at least one image; and
display, in response to the third input, a target operation interface of a target application program corresponding to the target image.

* * * * *